United States Patent
Burts, Jr. et al.

(10) Patent No.: US 10,280,358 B2
(45) Date of Patent: May 7, 2019

(54) NON-INVASIVE CEMENT SPACER FLUID COMPOSITIONS, SPACER FLUID PRODUCTS, METHODS OF WELL OPERATION AND WELL APPARATUS

(75) Inventors: Boyce D. Burts, Jr., Lafayette, LA (US); Boyce Donald Burts, III, Youngsville, LA (US)

(73) Assignee: BOTTOM LINE INDUSTRIES, INC., Richland, LA (US)

(*) Notice: Subject to any disclaimer, the term of this patent is extended or adjusted under 35 U.S.C. 154(b) by 212 days.

(21) Appl. No.: 13/410,279

(22) Filed: Mar. 1, 2012

(65) Prior Publication Data

US 2012/0305250 A1    Dec. 6, 2012

Related U.S. Application Data

(60) Provisional application No. 61/448,185, filed on Mar. 1, 2011.

(51) Int. Cl.
| | | |
|---|---|---|
| *C09K 8/40* | (2006.01) | |
| *C04B 26/28* | (2006.01) | |
| *C09K 8/42* | (2006.01) | |
| *C09K 8/44* | (2006.01) | |
| *C04B 103/46* | (2006.01) | |

(52) U.S. Cl.
CPC ................ *C09K 8/40* (2013.01); *C04B 26/28* (2013.01); *C09K 8/424* (2013.01); *C09K 8/44* (2013.01); *C04B 2103/46* (2013.01); *Y02W 30/97* (2015.05)

(58) Field of Classification Search
CPC ......... E21B 21/003; C09K 8/40; C09K 8/424; C09K 8/035
See application file for complete search history.

(56) References Cited

U.S. PATENT DOCUMENTS

| | | | | |
|---|---|---|---|---|
| 4,439,328 A | * | 3/1984 | Moity | 507/204 |
| 5,030,366 A | * | 7/1991 | Wilson | C04B 24/28 |
| | | | | 166/291 |
| 6,117,226 A | * | 9/2000 | Dial et al. | 106/162.8 |
| 6,218,343 B1 | * | 4/2001 | Burts, Jr. | 507/225 |
| 7,007,754 B2 | * | 3/2006 | Fanguy et al. | 166/292 |
| 2002/0023883 A1 | * | 2/2002 | Adams et al. | 210/780 |
| 2006/0201714 A1 | * | 9/2006 | Seams et al. | 175/65 |
| 2008/0017376 A1 | * | 1/2008 | Badalamenti | C04B 28/02 |
| | | | | 166/292 |
| 2008/0020948 A1 | * | 1/2008 | Rodrigues et al. | 507/111 |
| 2008/0085841 A1 | * | 4/2008 | Brown | 507/104 |
| 2010/0298175 A1 | * | 11/2010 | Ghassemzadeh | 507/124 |

* cited by examiner

*Primary Examiner* — Andrew Sue-Ako
(74) *Attorney, Agent, or Firm* — Gilbreth & Associates, PC; J. M. (Mark) Gilbreth

(57) ABSTRACT

Spacer compositions and products may include a biopolymer component, a plant fiber component, and a weighting agent component, and in further non-limiting embodiments may include xanthan gum, a blend of plant fibers, and a weighting agent component. These spacer compositions and spacer products may be utilized in well fluid operations, including well cementing operations and well completion operations.

3 Claims, No Drawings

NON-INVASIVE CEMENT SPACER FLUID COMPOSITIONS, SPACER FLUID PRODUCTS, METHODS OF WELL OPERATION AND WELL APPARATUS

RELATED APPLICATION DATA

This application claims priority of U.S. Provisional Patent Application No. 61/448,185, filed Mar. 1, 2011, the specification of which is incorporated herein.

BACKGROUND OF THE INVENTION

1. Field of the Invention

The present invention relates to spacer fluid compositions, spacer fluid products, methods of well operation and well apparatus. In another aspect, the present invention relates to non-invasive (i.e., minimal loss to formation) spacer fluid compositions, non-invasive spacer fluid products, methods of well operation and well apparatus. In even another aspect, the present invention relates to cement spacer compositions, cement spacer products, methods of cementing wells, and hydrocarbon well apparatus. In still another aspect, the present invention relates to completion spacer compositions, completion spacer products, methods of well completion, and well apparatus.

2. Brief Description of the Related Art

In the drilling and completion of an oil or gas well, a cementing composition is often introduced in the well bore for cementing pipe string or casing in a process known as primary cementing. In primary cementing, a cementing composition is pumped into the annular space between the walls of the well bore and the casing. The cementing composition sets in the annular space, supporting and positioning the casing, and forming a substantially impermeable barrier/mass or cement sheath. An essential function of cementing is to prevent fluid exchange between the different formation layers through which the hole passes and to control the ingress of fluid into the well, in particular to limit the ingress of water. In production zones, the casing, the cement and the formation are all perforated over a depth of a few centimeters.

"Associative Polymers for Invasion Control in Water- and Oil-based Mudsand in Cementing Spacers Laboratory and Field Case Histories", Reid et al., AADE-04-DF-HO-3, discloses that it has long been recognized that it is very desirable to minimize the invasion of drilling fluids, completion fluids, workover fluids and cements into subsurface formations. Further discloses that fluid invasion during drilling and completion operations causes many of the biggest problems faced in well construction. Even further discloses that in the payzone, invasion can produce formation damage as well as affect the quality of log information and fluid samples.

The prior art is replete with many disclosures of cementing in wells penetrating subterranean formations. In such operations, drilling fluids (often referred to as "muds") are normally present in oil and other similar wells at the time of cementing a casing into a borehole with an aqueous cement slurry. Since the mud and cement are not always compatible with each other, it is often desirable to separate or prevent contact between them by use of a cement spacer system. Without the use of such spacer systems, the incompatibility of the aqueous cement slurry with the oil based mud is often of such severity that a mixture of the two forms an unpumpable mass. Such unpumpable masses may prevent displacement of at least a portion of the drilling fluid with a cement spacer system. Spacer systems also serve to water-wet the wellbore surfaces to promote bonding of the cement sheath to the wellbore and casing. Such cement spacer systems are often thought of as flushing agents.

In a typical operation, the cement spacer system is prepared at the site of entry into the well bore such that the density of the system matches or exceeds the densities of the fluids to be removed from the well and the like. In some commercial embodiments, mixing equipment for such applications may take the form of a 50 to 100 barrel "batch mixer" or be mixed "on the fly". Some batch mixers may be hydraulically powered, self-contained unit that mix the cement spacer formulation immediately prior to the cementing operation. Such units are equipped with large paddles to facilitate the mixing of the cement spacer, centrifugal pumps for circulation of the spacer within the batch mixer and pressurized bulk storage tanks for the transport of the weighting agent for the cement spacer. Batch mixers may be truck-mounted or skid mounted depending on wellsite location requirements.

Once at the drilling site, the spacer system must be prepared from its constituent materials (typically water, gelling agent and weighting agent) and combined with any additional materials (such as surfactants or mutual solvents). The cement spacer system must then be tested for the appropriate density, with the density adjusted to fall within the appropriate range for the particular well bore. Independent of the particular chemistry of the cement spacer system, the storage time of the finished spacer prior to pumping into the wellbore is generally limited due to gravitational settling of the weighting agent.

U.S. Patent Application Publication No. 20100243236, published Sep. 30, 2010, by Koons, discloses nanoparticle-densified Newtonian fluids for use as cementation spacer fluids and completion spacer fluids in oil and gas wells. The publication discloses methods for densifying cement spacer fluids for use in conjunction with drilling fluids and cement slurries for cementing operations involving oil and gas wells, wherein such densifying is done via the addition of nanoparticles to the spacer fluid. Also disclosed are analogous methods of densifying completion spacer fluids using nanoparticles, to Newtonian fluid compositions resulting from any such fluid densification, and to systems for implementing the use of such compositions in well cementing operations.

U.S. Pat. No. 7,007,754, issued Mar. 7, 2006 to Fanguy, Jr., et al., discloses a method of cementing an area of a borehole with aqueous cement spacer system. The storable cement system comprises a suspending agent, a cement spacer and water. The composition may further optional contain a surfactant and/or an organic solvent and/or a weighting material. The suspending agent is preferably a carrageenan or scleroglucan. The cement system may be stored for an extended period of time prior to being interposed between a cement slurry and a drilling fluid. As such, the aqueous cement system may be made off-site and used when desired for preventing contact between non-compatible hydrocarbonaceous and aqueous fluids.

All of the patents cited in this specification, are herein incorporated by reference.

However, in spite of the above advancements, there exists a need in the art for compositions, products, methods and apparatus for well operations.

There also exists a need in the art for compositions, products, methods and apparatus for cementing wells.

There even also exists a need in the art for compositions, products, methods and apparatus for completing wells.

There still also exists a need in the art for non-invasive compositions, products, methods and apparatus for cementing wells.

There yet also exists a need in the art for compositions, products, methods and apparatus for cementing wells that prevent/reduce and/or minimize fluid loss.

There even still exists a need in the art for compositions, products, methods and apparatus for cementing wells that prevent/reduce and/or minimize gas displacement.

These and other needs in the art will become apparent to those of skill in the art upon review of this specification, including its drawings and claims.

SUMMARY OF THE INVENTION

It is an object of the present invention to provide for compositions, products, methods and apparatus for well operations.

It is another object of the present invention to provide for compositions, products, methods and apparatus for cementing wells.

It is even another object of the present invention to provide for compositions, products, methods and apparatus for completing wells.

It is still another object of the present invention to provide for non-invasive compositions, products, methods and apparatus for cementing wells.

It is yet another object of the present invention to provide for compositions, products, methods and apparatus for cementing wells that prevent/reduce and/or minimize fluid loss.

It is even still another object of the present invention to provide for compositions, products, methods and apparatus for cementing wells that prevent/reduce and/or minimize gas displacement.

This and other objects of the present invention will become apparent to those of skill in the art upon review of this specification, including its drawings and claims.

According to one non-limiting embodiment of the present invention, there is provided a well operation spacer composition comprising a polymeric component; a fiber component; and, a weighting agent component.

According to another non-limiting embodiment of the present invention, there is provided a well operation spacer product comprising an aqueous component; a polymeric component; a fiber component; and, a weighting agent component.

According to even another embodiment of the present invention, there is provided a method of operating a well comprising, adding a spacer product to the fluid in the wellbore, the product comprising: an aqueous component; a polymeric component; a fiber component; and, a weighting agent component.

According to still another embodiment of the present invention, there is provided a well comprising a fluid in the wellbore, the fluid comprising: a polymeric component; a fiber component; and, a weighting agent component.

This and other embodiments of the present invention will become apparent to those of skill in the art upon review of this specification, including its drawings and claims.

DETAILED DESCRIPTION OF THE INVENTION

The spacer compositions of the present invention may include a polymeric component, a fiber component, and a weighting agent component. More particularly, the spacer compositions of the present invention may include a biopolymer component, a plant fiber component, and a weighting agent component. Even more particularly, the spacer compositions of the present invention may include a polysaccharide component, a plant fiber blend component, and a weighting agent component. Even more particularly, the spacer compositions of the present invention may include a polysaccharide component, a synthetic fiber component, and a weighting agent component. Even more particularly, the spacer compositions of the present invention may include a polysaccharide component, an animal fiber component, and a weighting agent component. Still more particularly, the spacer compositions of the present invention may include a xanthan gum, a blend of plant fibers, and a weighting agent component. Non-limiting examples of plant fibers include those derived from rice, peanut hulls and corncobs (beeswings, pith and/or chaff "BPC").

Suitable fibers, polymers, aqueous solutions, well fluid additives, and other additives, may be found in any number of patents including U.S. Pat. Nos. 7,886,823 7,748,455 7,409,990 7,363,976 6,997,261 6,939,833 6,932,158 6,927,194 6,867,170 6,750,179 6,716,798 6,323,158 6,218,343 6,102,121 6,098,712 6,016,879 6,016,871 6,016,869 5,763,367 5,599,776 and/or 5,332,724, all of which are herein incorporated by reference for all they teach.

The polymer component of the present invention may be selected to provide desired rheology, viscosity and/or settling properties. The polymer may be any suitable polymer as known in the drilling art. Non-limiting examples include natural polymers such as starch, xanthan gum, guar gum, and wellan gum, and include modified natural polymers such as carboxymethyl cellulose (CMC), polyanionic cellulose (PAC), hydroxypropyl (HP) guar, carboxymethyl (CM) starch, hydroxy ethyl cellulose (HEC), and include synthetic polymers such as polyacrylates, polyacrylamide, vinyl copolymer, and styrene copolymer. These polymers may function as follows, biopolymers, HEC and polyacrylamide as viscosifiers, CMC, PAC, starch, CM starch and polyacrylates as fluid loss control agents, and polyacrylates, and polyacrylates, polyacrylamides and various other copolymers for reactivity. In some non-limiting embodiments, the polymer component may be a biopolymer in general, modified cellulosic polymers, polysaccharides, or starches. Any polymer utilized herein may have surface functionality.

In general, biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

In some non-limiting embodiments, the fiber material may comprise hydrophobic fibers selected from among synthetic fibers, polymer fibers, nylon, rayon, and hydrocarbon fibers, and/or hydrophilic fibers selected from among glass, cellulose, carbon, silicon, graphite, calcined petroleum coke, and cotton fibers, or comprise fibers derived from nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof, and animal fibers. In some non-limiting embodiments, the fibers function as a filtration control agent.

The weight ratio of the components of the spacer compositions of the present invention may generally be as follows: for each 1 lb of polymeric component, in the range of about 0.5 to 15 lbs fiber component, and in the range of about 0.5 to 20 lbs of weighting agent component. Non-limiting examples of suitable weighting agents include clays, barite, hematite, metal oxides or other dispersed solids. The weight ratio of the components of the spacer compositions of the present invention may generally be as follows: for each 1 lb of polymeric component, 0.5, 1, 2, 3, 4, 5, 6, 7, 8, 9, 10, 11, 12, 13, 14 or 15 lbs of fiber component, and 0.5, 1, 2, 3, 4, 5, 6, 7, 8, 9, 10, 11, 12, 13, 14, 15, 16, 17, 18, 19 or 20 lbs of weighting agent component. It should be understood that based on 1 lb of polymeric component, any suitable amounts of fiber component and weighting agent as shown above may be selected. The density of the spacer fluid will generally be selected to be less than the density of the lead cement and yet more than the density of the drilling fluid. In essence, in the well, the spacer will push the drilling fluid, and the cement will push the spacer. As a non-limiting example, a cement of density 14 lb/gal, a spacer of density 13 lb/gal, and a drilling fluid of 12 lb/gal.

The spacer composition of the present invention may include other components as desired for the particular well operation. As non-limiting examples, anti-settling agents, dispersal agents, fluid loss controlling agents, viscosifying agents, and the like. For aqueous-based spacer fluids, all of such one or more additional components may be soluble and/or dispersible in water. Furthermore, in some instances a single component additive may impart a plurality of properties to the resulting fluid mixture. Such optional components my be present (per each 1 lb of polymeric component) in the range of about 0.5 to about 20 lbs of optional components, specifically for each 1 lb of polymeric component 0.5, 1, 2, 3, 4, 5, 6, 7, 8, 9, 10, 11, 12, 13, 14, 15, 16, 17, 18, 19 or 20 lbs of optional component.

As a non-limiting example, the spacer composition may include as a optional component in the range of about 0.5 to about 8 lbs of FLC 2000™ agent for each 1 lb of polymeric component, more particularly 0.5, 1, 2, 3, 4, 5, 6, 7, or 8 lbs of FLC for each 1 lb of polymeric component.

FLC 2000™ agent is a fluid loss control and stabilizing agent and is a high temperature stable dynamic Fluid Loss Control and Borehole Stabilizing Agent, not affected by borehole contaminants, for water or oil-based muds. This product converts almost any water and oil based drilling or workover fluid (including sodium formate) into a non-invasive fluid FLC 2000™ agent is a precise formulation of fluid loss controlling and shale stabilizing polymers of varying solubilities, based on surface chemistry effects to minimize wall cake thickness, reduces differential sticking, and mechanically stabilize weak sands, shales, and faults, in either water or oil muds.

The spacer products of the present invention may generally comprise an aqueous component and the spacer composition. As a non-limiting example, the aqueous component may be fresh water. The spacer products may generally comprise in the range of about 0.5 to about 30 lbs of spacer composition for each 0.5 to 1000 gallons of aqueous solution. More particularly, the spacer products may generally comprise 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 lbs of spacer composition for each 0.5, 1, 5, 10, 15, 20, 25, 30, 35, 40, 42, 45, 50, 55, 60, 65, 70, 75, 80, 85, 90, 95, 100, 250, 500, 750 or 1000 gallons of aqueous solution.

The non-limiting examples are provided merely to illustrate non-limiting embodiments of the present invention. These examples are formulated for mixture with 42 gallons of fresh water, although they could be mixed with any suitable number of gallons of any suitable aqueous component.

Some embodiments of the compositions, products, methods and apparatus of the present invention prevent/reduce and/or minimize fluid loss and/or minimize gas displacement.

A specific non-limiting example of a spacer composition of the present invention comprises:
- 9.0 lbs of high molecular weight xanthan biopolymer (a suitable polymer for all these examples includes KEL-ZAN® XCD available from Kelco Oil Field Group, and it is a dispersible, high molecular weight Xanthan biopolymer used for
- rheology control in water based systems, and is a non-hazardous material and can safely be used in environmentally sensitive areas.).
- 4.0 lbs of FLC 2000™ agent (from Impact Fluid Solutions is a blend of modified low molecular weight polymers, surface functionalized organic solids and other additives that impart ultra-low invasion properties to drilling, completion and workover fluids).
- 2.0 lbs of ULTRA SEAL® XP fibers (is a blend of specific micro-sized cellulosic fibers namely rice and corn materials, combined with a blend of organic polymers and lubricity enhancers).
- 9.0 lbs of Sodium Bentonite.

Another specific non-limiting example of a spacer composition of the present invention comprises:
9.0 lbs of high molecular weight xanthan biopolymer (XCD Polymer) DIACEL HE400™ polymer (high molecular weight polymer substituted for high temperature applications, for example when the temperatures are too high for xanthan, available from Drilling Specialties Company a Division of Chevron Phillips Chemical Company LP).
Concentrations range from 1-5 ppb depending upon the desired flow regime 6.0 lbs of GSX-305-05™ additive (Blend of Plant Fibers, Modified Polysaccharide & Carbon) 9.0 lbs of Sodium Bentonite.

Even another specific non-limiting example of a spacer composition of the present invention comprises:
- 9.0 lbs of high molecular weight xanthan biopolymer (XCD Polymer)
  - DIACEL HE400™ polymer is substituted for high temperature applications Concentrations range from 1-5 ppb depending upon the desired flow regime 2-4 lbs of GSX-305-05 (Blend of Plant Fibers, Modified Polysaccharide & Carbon)

2-4 lbs of Ultra Seal® XP 9.0 lbs of Sodium Bentonite.

Still another specific non-limiting example of a spacer composition of the present invention comprises:

9.0 lbs of high molecular weight xanthan biopolymer (XCD Polymer)

Diacel HE400 is substituted for high temperature applications Concentrations range from 1-5 ppb depending upon the desired flow regime 6.0 lbs of ULTRA SEAL® XP fibers (Blend of Plant Fibers, Modified Polysaccharide & Carbon)

9.0 lbs of Sodium Bentonite.

The spacer compositions, spacer products, and well operation methods may prevent filtrate invasion, lost circulation, improve cement bond and/or prevent gas invasion, during and/or after the particular well operation.

Additionally, the spacer compositions, spacer products, and well operation methods may separate drilling fluid from cement, may clean the well, may be compatible with both drilling fluid and cement, and/or may assist in maintaining well control.

Even additionally, the spacer compositions, spacer products, and well operation methods may form an impermeable membrane rather than filter cake. More particularly, the spacer membrane may be sufficiently strong to prevent loss of whole fluid into a weak formation, the spacer alone may cure moderate losses, in some instances the addition of fibers (as a non-limiting example the commercially available Ultra Seal® Plus) may cure severe losses, the low permeable membrane may inhibits loss of filtrate from cement during and/or after placement, and/or may maintains hydrostatic pressure longer during cement's transition time.

Still additionally, the spacer compositions, spacer products, and well operation methods may protect the formation from filtrate damage, may stop volume losses during well operations (for example cementing), may mitigates gas flow after the well operation (for example cementing), may be compatible with water base and oil base drilling fluids, including synthetic oil base drilling fluids (a liquid or dry surfactant or blends of surfactants may be added to the spacer to make the spacer slurry compatible with oil base mud), and/or may be weighted up to 19.0 lb/gal with any suitable weighting agent (non-limiting examples include calcium carbonate, barite and hematite).

The primary requirement for cement spacer fluids is that they be compatible with both the drilling fluid and the cement slurry that they are used in conjunction with. Additionally, the spacer fluids should possess certain rheological tendencies, such as turbulent flow at lower shear rates, which assist in granular solids removal and which encourage the removal of the drilling fluid filter cake from the walls of the well. Turbulent flow is generally regarded as the most effective method for well cleaning during cementing operations, although laminar flow may also be utilized in some embodiments.

The density (or weight) of a cement spacer fluid should be variable and will typically be adjusted according to well control and compatibility parameters associated with the particular drilling fluid and cement slurry with which it is associated. In some instances, where there is a density mismatch between the drilling fluid and the cement slurry, the spacer fluid is densified such that it is intermediate between that of the drilling fluid and the cement slurry. Additionally, the density of the spacer fluid can be graduated to better match the densities of the fluids between which it is interposed. See, e.g., Wilson, U.S. Pat. No. 5,027,900. For turbulent flow, the density of the cement spacer fluid is typically limited to about 10 pounds per gallon (ppg) using traditional densification methodologies (e.g., saturated NaCl brine).

Cement slurries are typically more viscous than the drilling fluids preceding them in a given cement job, and spacer fluids have historically had viscosities that are typically intermediate to that of the drilling fluid and cement slurry they are used in conjunction with, wherein the relatively high viscosity of such spacers generally requires that they be pumped under laminar flow. The viscosity of the cement slurry is also largely a function of the various components added thereto. To retain the desired rheological properties and permit turbulent cleaning of the well, such spacer fluids should generally have a relatively low viscosity (e.g., about 5 centipoise (cP) or less).

Historically, cement spacers have been densified by adding viscosifying agents and/or non-soluble weighting agents to fresh water, seawater, brines, or other aqueous or non-aqueous base spacer fluids (higher viscosity is needed to support the dispersion of the weighting agents). The resulting fluids, however, are either high viscosity Newtonian fluids, Bingham plastic fluids, power law fluids, or modified Herschel-Bulkley fluids—all of which are incapable of being placed in turbulent flow, at achievable rates, around the entire annular region. Accordingly, such fluids must be pumped in laminar flow to maintain well control and effective cementation of the annular space.

The spacer compositions and products of the present invention may be utilized in any well fluid operation, including completion operations and cementing operations. The spacer compositions and spacer products may be utilized in wells and well operations in general, more particularly hydrocarbon wells, oil wells, gas wells, and/or oil and gas wells.

The present invention is also directed to methods of using such space compositions and/or spacer products in any suitable well operation, non-limiting examples of which include cementing operations and completion operations. The present invention is also directed to well operation methods utilizing the space compositions and/or spacer products of the present invention, non-limiting examples include methods of cementing wells and methods of completing wells.

The present invention is also directed to apparatus comprising a wellbore comprising a well fluid residing therein comprising the spacer composition and/or products of the present invention.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A method of operating a well comprising a wellbore with a well fluid residing in the wellbore, the method comprising:

adding a spacer product to the wellbore to push the fluid in the wellbore, the spacer product comprising:

an aqueous component and a spacer composition dispersed therein, wherein the spacer composition comprises:
a polymeric component comprising starch and a dispersible xanthan biopolymer;
a fiber component; and,
a weighting agent component comprising sodium bentonite,
wherein for each part by weight of polymeric component there are from 0.5 to 20 parts by weight of the weighting agent and from 0.5 to 15 parts by weight of the fiber component, and in the range of about 0.5 to about 30 lbs of spacer composition for each 0.5 to 1000 gallons of aqueous component; and,
adding a cement composition to the wellbore to push the spacer composition.

2. The method of claim 1, wherein fiber component is a plant fiber.

3. A method of operating a well comprising a wellbore with a well fluid residing in the wellbore, the method comprising:
adding a spacer product to the wellbore to push the fluid in the wellbore, the spacer product comprising:
an aqueous component and a spacer composition dispersed therein, wherein the spacer composition comprises:
a polymeric component comprising organic polymer and a dispersible xanthan biopolymer;
a fiber component comprising micro-sized cellulosic fibers; and,
a weighting agent component comprising sodium bentonite,
wherein for each part by weight of polymeric component there are from 0.5 to 20 parts by weight of the weighting agent and from 0.5 to 15 parts by weight of the fiber component, and in the range of about 0.5 to about 30 lbs of spacer composition for each 0.5 to 1000 gallons of aqueous component; and,
adding a cement composition to the wellbore to push the spacer composition.

* * * * *